Oct. 24, 1939.   H. C. SLOAN   2,177,537
SPEED CONTROL DEVICE
Filed July 28, 1937   2 Sheets-Sheet 1
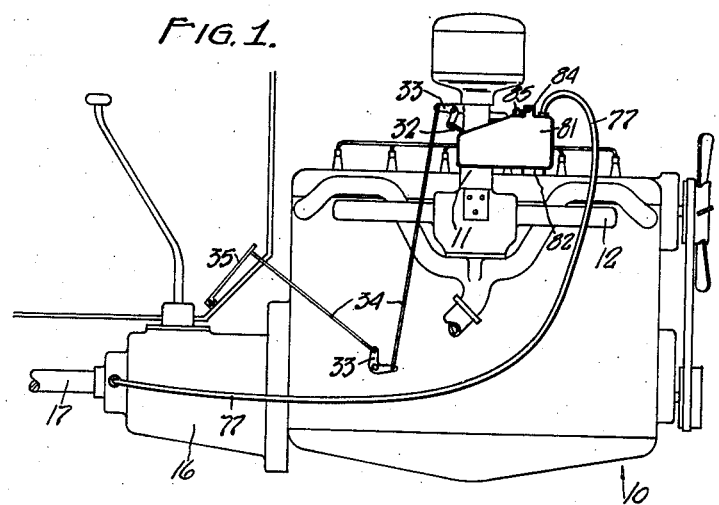
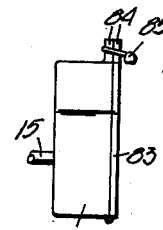
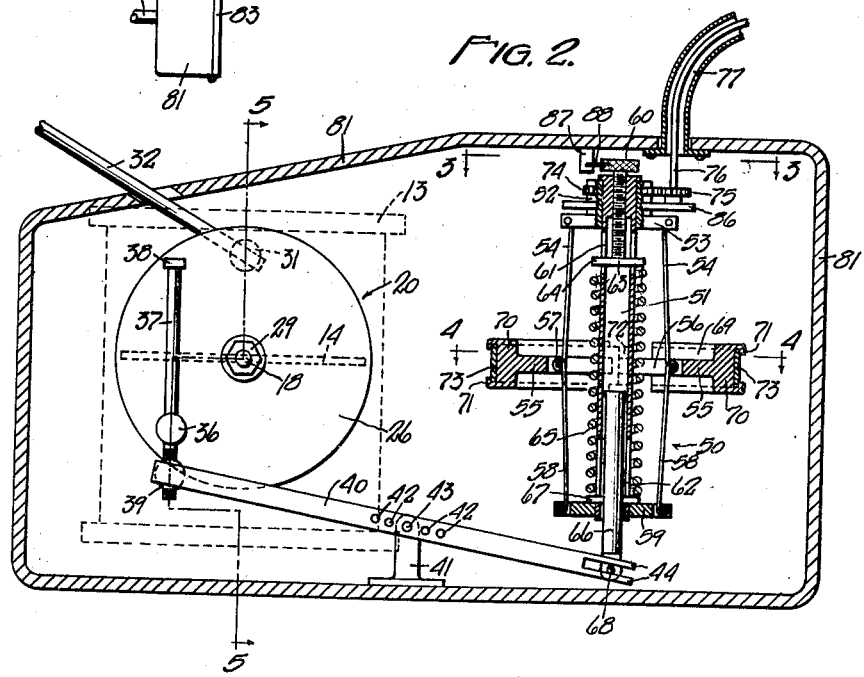
INVENTOR.
HENRY C. SLOAN.
BY Oltsch & Knoblock
ATTORNEYS.

Oct. 24, 1939.  H. C. SLOAN  2,177,537
SPEED CONTROL DEVICE
Filed July 28, 1937    2 Sheets-Sheet 2
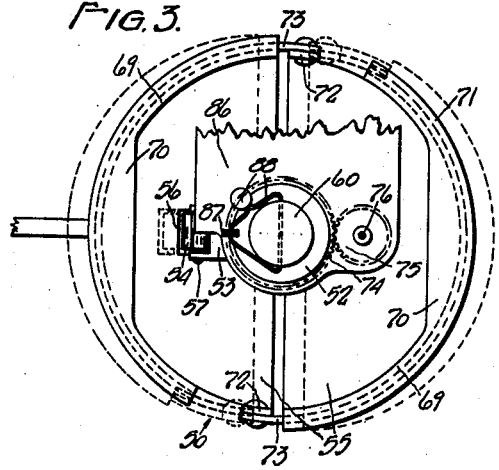
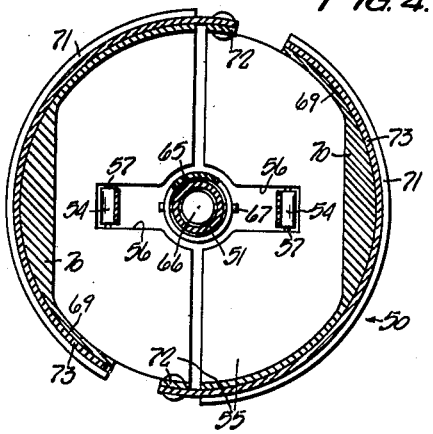
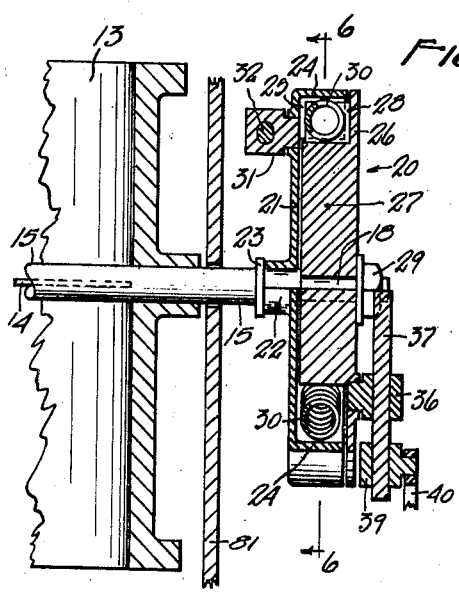
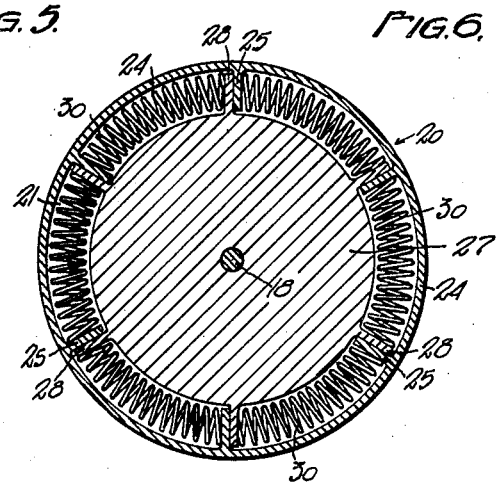
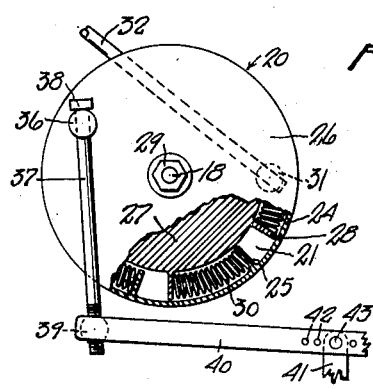
INVENTOR.
HENRY C. SLOAN.
BY
ATTORNEYS.

Patented Oct. 24, 1939

2,177,537

UNITED STATES PATENT OFFICE 2,177,537

SPEED CONTROL DEVICE

Henry C. Sloan, South Bend, Ind.

Application July 28, 1937, Serial No. 156,188

9 Claims. (Cl. 137—139)

This invention relates to speed control devices, and particularly to devices for controlling the speed of a motor vehicle.

Speed control devices or governors have heretofore been applied to automobiles and other motor vehicles, and these have been of various types and have operated upon various principles. Chief among these have been devices for controlling engine speed, and thereby controlling vehicle speed. Such devices have proven to be objectionable and undesirable under various operating conditions because of the necessity of adjusting the governor to limit engine speed at a point where the predetermined maximum vehicle speed is attained when the vehicle is traveling in high gear. Such a setting fails to provide adequate engine speed, in vehicles such as truck under heavy load, to permit the rapid starts required for city driving where stops are frequent by reason of traffic control systems. Another condition which results from a governor of this type is insufficient power on steep grades or the like in cross-country driving. In other words, such governors cut down the power of the vehicle to a point where certain operating requirements commonly met with cannot be obtained, and hence are unsatisfactory and may be dangerous. These inadequacies have been recognized, and various attempts to overcome them have been provided. However, in all such devices with which I am familiar some equally objectionable feature has been present. Another objection to previous speed control devices has been the failure to coordinate the governor or speed responsive member with the throttle. In some instances, two carburetor valves have been provided, one controlled by the throttle and the other by the speed responsive member. This construction is subject to the objection that the fuel mixture may be "backed up" when the valve operated by the speed responsive element is closed, thereby permitting "raw" fuel to enter the intake manifold. Other devices heretofore developed are subject to objections such as accessibility for tampering, excessive cost, and the like.

It is, therefore, the primary object of my invention to provide a novel speed control device for motor vehicles wherein engine speed is responsive to and directly operated by vehicle speed at maximum limits.

A further object is to provide a device of this character with a novel governor unit.

A further object is to provide a device of this character with a novel arrangement for driving and adjusting the governor.

A further object is to provide a device of this character with a novel lost motion mechanism between the carburetor and the throttle and governor.

A further object is to provide a small compact unitary device of this character which can be readily installed.

A further object is to provide a device of this character which is substantially tamper-proof.

A further object is to provide a device of this character which is simple and inexpensive to manufacture and assemble.

Other objects will be apparent from the drawings, description and claims.

In the drawings:

Fig. 1 is a fragmentary side elevational view of the engine and transmission of a motor vehicle, illustrating my device applied thereto.

Fig. 2 is a side view of my device with parts shown in section.

Fig. 3 is a top plan view of the governor with parts in section on line 3—3 of Fig. 2.

Fig. 4 is a horizontal sectional view of the governor taken on line 4—4 of Fig. 2.

Fig. 5 is a vertical sectional view taken on line 5—5 of Fig. 2 and illustrating the application of the lost motion mechanism to the carburetor.

Fig. 6 is a sectional view of the lost motion mechanism taken on line 6—6 of Fig. 5.

Fig. 7 is a side view of the lost motion mechanism in governor-controlled position, with parts shown in section.

Fig. 8 is an end view of the casing of my device.

Referring to the drawings, which illustrate the preferred embodiment of my invention, the numeral 10 designates a conventional internal combustion engine of a motor vehicle. Engine 10 has the usual carburetor 11 and intake manifold 12; the carburetor 11 having the usual valve chamber 13 wherein a butterfly valve 14 is fixedly mounted on a rotatable shaft 15. The engine shaft (not shown) is connected to the usual transmission 16 which controls the drive shaft 17 of the vehicle. I provide valve shaft 15 of a length to project outwardly from valve chamber 13 at one end, and with a reduced diameter end portion 18 thereof in spaced relation to said chamber 13.

On the projecting end of shaft 15, I mount a lost motion mechanism 20. This lost motion mechanism preferably comprises an inner disc 21 rotatably mounted at its center on shaft 15 and preferably provided with a collar 22 fitting on said shaft and bearing against an enlargement 23 on said shaft to properly position the same. A cylindrical flange 24 is preferably formed integrally with the outer periphery of disc 21 and extends outwardly therefrom. A plurality of stops 25 are carried by the disc 21 and flange 24, said stops constituting radially extending rectangular plates whose outer edges terminate slightly inwardly of the outer edge of flange 24, and whose radial dimension is approximately equal to their axial dimension. An outer disc 26 is mounted on the reduced end portion 18 of shaft 15, said disc being of the same diameter as disc 21. Disc 26 is provided with a central inwardly projecting cylindrical thickened portion 27 whose radius is slightly less than the radial spacing of the inner edges of stops 25 from the center or axis of disc 21. A plurality of stops 28, equal in number to stops 25 and arranged in complementary relation thereto, are carried by disc 26. Stops 28 preferably constitute radial rectangular plates projecting from the inner face of disc 26 and from the periphery of thickened portion 27, and are of substantially the same size as stops 25. The discs 21 and 26 fit together with thickened portion 27 of disc 26 fitting within the cylindrical flange 24 of disc 21, and the stops 25 and 28 of each clearing the portions of the other at its edges but adapted to abut in face engagement as illustrated in Fig. 6. Disc 26 is fixedly secured on the reduced end portion 18 of shaft 15 by nut 29 and associated securing means which press the thickened central portion 27 of disc 26 tight against the shoulder on said shaft, but without clamping against the inner disc 21. The discs 21 and 26 are adapted to be readily formed as described by die-casting or like inexpensive methods, and when assembled in operative relation on shaft 15 with the respective stops thereof in abutment, form a closed annular chamber divided into arcuate sections of equal length by said stops. A coil spring 30 is mounted in each section of said annular chamber to normally hold said stops 25 and 28 in abutment, as illustrated in Fig. 6. A stud 31 is journaled in disc 21 adjacent the periphery thereof to project exteriorly thereof, and to this stud is secured a link 32 which is connected by any suitable means, as bell cranks 33, and links 34, with the accelerator 35 of the vehicle. A stud 36 is pivoted to the disc 26 and extends exteriorly thereof, and is provided with an aperture therethrough slidably receiving a rod 37 which is provided with an enlarged head 38 at one end. The other end of rod 37 is threaded for adjustable connection with a stud 39 rotatably carried by one end of a lever 40 which is pivotally mounted on a bracket 41 intermediate its ends. Lever 40 is provided with a plurality of spaced pivot apertures 42 for selective connection with pivot 43 carried by bracket 41. The opposite end of lever 40 is bifurcated at 44 for pivotal connection with a governor 50.

Governor 50 preferably comprises an elongated hollow tube 51 rotatably mounting a head or drum 52 at its upper end. An upper cross head 53 is fixedly carried by drum 52; and to the outer ends of cross head 53 are pivoted the upper ends of a pair of rigid straps 54. To the lower end of each strap 54 is pivoted a substantially semicircular plate 55 recessed at 56 to fit loosely around tube 51 at its inner side, said straps 54 extending freely into said recesses 56 and being pivoted at 57 to said plates. Lower straps 58 of a length equal to the length of straps 54 are pivoted to the lower ends of straps 54 and to plates 55; and the lower ends of straps 58 are pivotally connected to the opposed ends of a lower cross head 59 which is rotatable and slidable on tube 51. A thumb screw 60 is axially threaded in the upper reduced end of tube 51 and extends in said tube to a point below upper cross head 53. A pair of opposed longitudinal slots 61 are formed in the upper end of tube 51; and a similar pair of opposed longitudinal slots 62 are formed in the lower end of tube 51. A member 63 is slidable in tube 51 and is provided with opposed arms 64 projecting through the opposed upper slots 61. Thumb screw 60 bears on member 63, and the arms 64 of said member bear on the upper end of a coil spring 65 encircling tube 51. A shaft 66 is slidably mounted in the lower end of tube 51 and is provided with opposed laterally projecting arms 67 which extend through the lower tube slots 62 and upon which the lower end of coil spring 65 bears. Shaft 66 normally projects from the lower end of tube 51 and carries a pin 68 slidably and pivotally engaging the bifurcated end 44 of lever 40.

Plates 55 are provided with enlarged peripheral portions 69 thickened in opposed substantially central relation at 70; and portions 69 are provided with opposed upper and lower guides 71 at their outer arcuate edges. The portions 69 preferably terminate at one end thereof in spaced relation to the inner edges of the respective plates; and at those points plates 55 are provided with flanges 72. A curved elongated spring plate 73 is secured to each flange 72, and extends therefrom around the portion 69 of the opposite plate and within the guides 71. Springs 73 thus serve to hold plates 55 in coplanar horizontal relation pressed inwardly toward each other so that their outer peripheries are substantially concentric as illustrated in full lines in Fig. 3.

An annular gear 74 is fixed on drum 52 and meshes with a drive pinion 75 rotated by a flexible shaft, link chain, or the like 76 which is housed in a flexible tube 77 which extends to a point rearwardly of transmission 16 whereby flexible shaft 76 may be driven by drive shaft 17 in any suitable manner well understood in the art.

The governor 50 and lost motion mechanism 20 are preferably encased in a housing 81 rigidly supported on engine 10 in required relation to carburetor 11 by means of suitable brackets 82. Housing 81 is provided with a pivoted closure 83, and complementary apertured lugs 84 on said housing and closure accommodate use of a conventional seal 85 comprising a wire loop whose ends are locked together by a lead or other suitable non-releasable locking member. The carburetor valve shaft 15 extends freely into said housing, as does also the throttle link 32. Bracket 41 pivoting lever 40 is supported in the housing. A bracket 86 within the housing rotatably mounts the governor at the drum 52 thereof, and said bracket also journals the drive pinion 75. Flexible shaft 76 extends freely into housing 81, and the end of flexible tube 77 is preferably secured to said housing. Housing 81 preferably carries a projecting apertured arm 87, and the head of thumb screw 60 is provided with a plurality of apertures extending radially therethrough. A conventional wire seal 88, as above described, may be used to hold said thumb screw against rotation and to prevent tampering, by threading the wire through the apertures of said screw head 60 and arm 87 before sealing the same.

The device is assembled and arranged as best illustrated in Fig. 2, wherein the parts are shown in inoperative position, i. e. the position assumed when the vehicle engine is not operating. It will thus be seen that, when the engine is started and throttle 35 is energized, throttle link 32 will shift to the right in Fig. 2, thereby rotating disc 21 in clockwise direction as viewed in said fig. The stops 25 of disc 21 rotate clockwise therewith, i. e. in direction away from stops 28 of disc 26, but the stops 28 are urged to follow stops 25 by the coil springs 30 positioned between adjacent pairs of said stops; so that disc 26 rotates with disc 21 and the carburetor is therefore operated directly through the lost motion mechanism 20 in full response to the actuation of throttle link 32. As long as the vehicle remains at a stand-still, the carburetor valve may be controlled throughout its full range to completely open position, by reason of the stationary condition of governor 50. This carburetor operation is accommodated by the sliding relation of rod 37 in stud 36 of disc 26 and the positioning of the head 38 of said rod in spaced relation to said stud to permit complete valve opening, i. e. rotation of disc 26 for a quarter-turn or 90 degrees, before the stud 36 engages said head 38. In this way the device permits the vehicle engine to develop maximum power to permit quick starting of the vehicle, as when under heavy load.

When the vehicle is placed in motion, the flexible shaft 76 driven by vehicle drive shaft 17, serves to drive or operate the governor 50 at a speed directly proportional to vehicle speed by means of pinion 75. Pinion 75 rotates the head 52, and the cross heads 53 and 59 and associated rotatable parts of the governor by means of gear 74 on said head. The thickened portions 70 of rotatable plates 55 of the governor constitute weights which exert a centrifugal force on the governor to separate said plates as shown in dotted lines in Fig. 3, as is conventional. As plates 55 separte laterally by centrifugal force, the spring plates 73 are stressed to resist such movement and to hold said plates in coplanar relation, all accommodated by the sliding of said spring plates in guide 71. The separation of plates 55 pivots straps 54 and 58 outwardly to raise the lower cross head 59 and the shaft 66 against the action of coil spring 65. Raising of shaft 66 pivots lever 40 to lower the rod 37 connected with the lost motion mechanism.

When the vehicle reaches the maximum speed for which the device is set, the head 38 of rod 37 comes into engagement with stud 36 on disc 26. Thereafter, any additional throttle operation will rotate disc 21, but the interengagement of rod head 38 and stud 36 prevents further rotation of disc 26 and of the carburetor valve shaft 15 to which said disc is fixed, so that the additional rotation of disc 21 merely serves to separate the stops 25 and 28 against the action of coil springs 30, holding disc 26 and carburetor valve shaft 15 at maximum position, as best illustrated in Fig. 7. It will be seen that, should vehicle speed lower while the parts are positioned as shown in Fig. 7, for instance by reason of climbing a grade, the governor speed will likewise proportionally decrease, so that governor rod 66 will lower and pivot lever 40 to raise the rod 37. This raising of rod 37 will permit disc 26 to rotate further and permit further rotation of valve shaft 15 whereby the carburetor valve 14 may be opened the needed amount to accelerate the engine and supply the added power required to maintain the maximum permitted speed. Thus the device permits the full capacity of the vehicle engine to be used whenever necessary for starting, hill climbing and the like, while at the same time preventing excessive vehicle speed.

It will be obvious that the device must be adjusted to the vehicle to which it is applied, and for this purpose three different adjustments are provided which give a wide adjusting range. The first of these adjustments is afforded by the spaced pivot apertures 42 in lever 40 to alter the leverage thereof and afford a rough or approximate adjustment. The bifurcated end 44 of said lever accommodates this adjustment in regard to the connection thereof with the governor; and the pivot mounting of stud 39 on said lever and of stud 36 on disc 26 accommodate this adjustment in relation to lost motion mechanism 20. The second adjustment is afforded by the threaded connection of rod 37 with stud 39 on lever 40 to adjust the normal position of head 38 of said rod, and this adjustment is made primarily to accommodate adjustment in the lever as above described. The third adjustment is afforded by the thumb screw 60, which controls the tension applied to spring 65 of the governor and permits a fine or delicate calibration of the device by delicate adjustment of the governor per se.

When installed as described, the device is substantially tamper-proof. The housing 81 is locked by seal 84, so that unauthorized access to the interior thereof for the purpose of changing the adjustment of the device cannot be had without discovery. The throttle mechanism is exposed, but tampering therewith will not result in change of the device or the adjustment thereof. The flexible shaft 76 is encased by the flexible tube 77 throughout its length from the transmission to housing 81, and the ends of said tube may be connected with said transmission and housing to prevent access to shaft 76. Additionally, the seal 88 serves to prevent change in the adjustment of screw 60 incident to vibration of the vehicle. It will also be obvious that the adjustment of rod 37 in stud 39 may also be locked by the use of a seal between said parts.

One of the advantages of the device is the simplicity of the construction and its adaptability for inexpensive fabrication. Thus, with respect to the lost motion mechanism, the discs 21 and 26 and their associated stops, flanges, etc. are readily adapted for manufacture by die casting. With respect to the governor, the plates 55 may obviously be die-cast, and other parts may also be die-cast and provided with bearing inserts or the like at bearing surfaces.

I claim:

1. Means for controlling a carburetor having a rotatable valve shaft, comprising a manually controlled cup-shaped member journaled on said shaft, a plate fixed on said shaft and juxtaposed to said member, said member and plate each carrying a stop, said stops being positioned for interengagement, a spring in said member for normally urging said stops in engagement and governor actuated means for limiting rotation of said plate, whereby rotation of said cup-shaped member is absorbed by said spring after said plate reaches maximum rotated position.

2. Means for controlling a carburetor having a rotatable valve shaft, comprising a manually controlled cup-shaped member journaled on said shaft, a circular member fixed on said shaft within said cup-shaped member and including a reduced width marginal portion, said members defining an annular chamber in said cup-shaped member, said cup-shaped and annular members each having a radial stop within said annular chamber, said stops being adapted to abut, an elongated coil spring in said chamber normally holding said stops in abutment and governor controlled means for limiting rotation of said circular member.

3. Means for controlling a carburetor having a rotatable valve shaft, comprising a pair of parts cooperating to form an annular chamber, one part being journaled on said shaft and the other being fixed on said shaft, members carried by each part projecting into said chamber and adapted for interengagement, resilient means in said chamber normally urging said members into engagement and governor controlled means for limiting rotation of said part fixed on said shaft.

4. Means for controlling an internal combustion engine having a carburetor including a rotatable valve shaft, comprising a manually controlled actuator journaled on said shaft, an operator fixed on said shaft, a resilient drive connection between said actuator and operator, a member eccentric of said shaft rotatably mounted on said operator, a governor, and lost motion means connecting said governor and operator including an elongated pivoted member having a limited longitudinal sliding engagement with said eccentric member.

5. Means for controlling the carburetor of an internal combustion engine comprising a governor, a lever pivoted responsive to operation of said governor, an elongated member pivoted to said lever and having a head spaced therefrom, a carburetor valve operator having a slidable connection with said member, and a manually controlled connection normally actuating said operator therewith, said head being adapted to limit actuation of said operator responsive to operation of said governor.

6. Lost motion mechanism comprising a pair of concentric interfitting parts, one of said parts being rotatable relative to the other, a resilient driving connection between said parts normally opposing relative rotation of said parts and means having a lost motion connection with one of said parts for limiting concurrent rotation thereof with the other part by said driving connection.

7. Lost motion mechanism comprising a pair of concentric members, a rotatable shaft fixedly mounting one member and journaling the other member, interengaging parts carried by said members, resilient driving means interposed between adjacent parts of said concentric members, and stop means having a lost motion connection with said fixedly mounted member.

8. Lost motion mechanism comprising a rotatable shaft, a member fixed on said shaft, a member journaled on said shaft, said members interfitting to provide an annular chamber therebetween, each member having a part projecting into said chamber, resilient means in said chamber abutting said projections at its ends whereby said means constitutes a yieldable operating connection for rotating one of said members upon rotation of the other, and stop means having a lost motion connection with said fixed member.

9. Lost motion mechanism comprising a pair of relatively rotatable concentric members, one member being cup-shaped and the other being of reduced diameter and fitting within the first member to provide an annular chamber therebetween, each member having a part projecting into said chamber, a resilient member in said chamber and abutting said parts to constitute a yieldable driving connection between said members, and stop means for one member having an exterior lost motion connection therewith.

HENRY C. SLOAN.